United States Patent [19]

Watanabe et al.

[11] Patent Number: 4,714,213

[45] Date of Patent: Dec. 22, 1987

[54] MAGNETIC TAPE CASSETTE WITH MAGNETIC TAPE PROTECTIVE CLOSURE AND BIAS MEANS THEREFOR

[75] Inventors: Toshihiro Watanabe; Hiroshi Meguro, both of Miyagi, Japan

[73] Assignee: Sony Corporation, Tokyo, Japan

[21] Appl. No.: 886,685

[22] Filed: Jul. 18, 1986

[30] Foreign Application Priority Data

Jul. 26, 1985 [JP] Japan ................................ 60-114800

[51] Int. Cl.⁴ .......................... G03B 1/04; G11B 23/04
[52] U.S. Cl. .......................................... 242/198; 360/132
[58] Field of Search ............... 242/198, 199; 360/132, 360/60

[56] References Cited

U.S. PATENT DOCUMENTS

| | | | |
|---|---|---|---|
| 4,372,504 | 2/1983 | Shibata et al. | 242/198 |
| 4,452,407 | 6/1984 | Ogata et al. | 242/198 |
| 4,572,461 | 2/1986 | Horikawa et al. | 242/198 |
| 4,589,609 | 5/1986 | Oishi et al. | 242/198 |
| 4,625,253 | 11/1986 | Kawakami et al. | 242/198 X |
| 4,634,020 | 1/1987 | Henegouwen et al. | 242/199 X |

*Primary Examiner*—Donald Watkins
*Attorney, Agent, or Firm*—Vorys, Sater, Seymour and Pease

[57] ABSTRACT

A magnetic tape cassette has a front end opening adjoining an underside cutout formed in the bottom of a cassette casing. The underside cut-out is openably covered by a sliding shutter member. A torsion spring is employed for biasing the sliding shutter member toward its closed position. The torsion spring is secured to the sliding shutter member and has an extension abutting around the lateral center portion of the inner surface of the cassette casing so as to bias the sliding shutter member frontwardly toward the closed position. The torsion spring thus provides an improved appearance and better productability with simplified mounting structure therefor.

13 Claims, 7 Drawing Figures

MAGNETIC TAPE CASSETTE WITH MAGNETIC TAPE PROTECTIVE CLOSURE AND BIAS MEANS THEREFOR

BACKGROUND OF THE INVENTION

The present invention relates generally to a magnetic tape cassette with a tape protective closure for openably closing an opening of a cassette casing. More specifically, the invention relates to a magnetic tape cassette, such as a pulse-code modulated (PCM) audio cassette, which has a tape protective closure and means for normally biasing the closure to a closed position.

U.S. Pat. No. 4,572,461, issued to Horikawa et al. on Feb. 25, 1986, and assigned to the assignee of the present invention discloses a cassette casing for a magnetic tape cassette with an openable and closable pivotal closure lid at its front portion and an openable and closable sliding shutter member at its lower surface. While the magnetic tape is not in use, the sliding shutter member covers the underside of the magnetic tape cassette to cover the reel shaft insertion apertures, and a cut-out for receiving a tape loading mechanism of a recording and/or reproducing apparatus. The pivotal closure lid and sliding shutter member couple while in the closed position. The sliding shutter member is biased toward the closed position by means of a coil spring.

A drawback is encountered in this mechanism due to the presence of the coil spring biasing the sliding shutter member toward the closed position. Specifically, in order to accommodate the coil spring, some clearance must be provided between the lower surface of the cassette casing and the upper surface of the sliding shutter member. This limits how thin the magnetic tape cassette can be made.

In addition, in order to anchor the front end of the coil spring, a spring anchor column must be formed in the lower section of the cassette casing, and in order to anchor the rear end, a spring anchor member must be formed in the sliding shutter member. The front and rear ends of the coil spring most also be hooked onto the spring anchor column and the spring anchor member during assembly. This makes assembly rather troublesome and thus degrades the manufacturing productivity of the magnetic tape cassette.

SUMMARY OF THE INVENTION

Therefore, it is a principle object of the present invention to provide a magnetic tape cassette which has a sliding shutter member with an associated biasing means which requires minimal space and thus allows the magnetic tape cassette to be made as thin as possible.

Another object of the present invention is to provide a sliding shutter member biasing means of the magnetic tape cassette which can be conveniently assembled.

In order to accomplish the aforementioned and other objects, a magnetic tape cassette, according to the present invention, employs a torsion spring biasing the sliding shutter member toward its closed position. The torsion spring is secured to the sliding shutter member and has an extension abutting the inner surface of the cassette casing so as to bias the sliding shutter member frontwardly toward the closed position.

According to one aspect of the invention, a magnetic tape cassette comprises a cassette casing housing a pair of tape reels and defining a cut-out formed at the front end of its floor and a front end opening through which a magnetic tape is exposed to the outside of the cassette casing, a closure member slidingly attached to the cassette casing for openably closing the cut-out, the closure member being movable between a first position closing the cut-out and a second position shifted rearwardly from the first position and thereby opening the cut-out, and a torsion spring associated with the closure member for biasing the latter toward the first position, the torsion spring being secured to the closure member for movement therewith and having one end engaging the inner periphery of the cassette casing so as to accumulate spring force as the closure member shifts toward the second position.

The cassette casing has a shield wall extending along the rear edge of the cut-out, and the one end of the torsion spring seats against the front surface of the shield wall. The torsion spring comprises a coil section wound around a pin extending from the closure member and bar-like section which has the one end seating against the shield wall.

In accordance with the preferred embodiment, the pin is located approximately in the lateral center of the front edge of the closure member and in front of the shield wall and has a top located immediately beneath the lower surface of the ceiling of the cassette casing so as to abut thereagainst in order to prevent significant deformation of the closure member.

Further preferably, the torsion spring further comprises another bar-like section abutting a projection extending from the closure member near the pin. The pin and projection are so located as to be positioned in front of the shield wall when the closure member is in the second position.

According to another aspect of the invention, a magnetic tape cassette comprises a cassette casing with a front end opening and an underside cut-out in the front edge of its floor, and a shield wall extending along the rear edge of the cut-out and defining an essentially enclosed internal space, which receives a tape reel onto which a magnetic tape is wound, and a tape run path exposed frontward and downward through the opening and cut-out, a sliding closure member slidingly attached to the bottom of the cassette casing and movable between a first position, in which the sliding closure member closes the cut-out, and a second position, in which the sliding closure member is away from the first position to open the cut-out, and a torsion spring having a first section secured to the sliding closure member in front of the sliding wall, and a second section abutting against the front surface of the shield wall for constantly exerting a frontward biasing force on the sliding closure member.

In the preferred construction, the first section of the torsion spring is in the form of a coil generating torsional force and wound around a pin near the front edge of the sliding closure member. The pin may be sufficiently tall to position its top near the lower surface of the ceiling of the cassette casing so as to abut thereagainst when the sliding closure member is slightly deformed downward.

According to preferred embodiment, the magnetic tape cassette further comprises a pivotal closure lid for openably closing the front end opening of the cassette casing. The pivotal closure lid is cooperative with the sliding closure member for movement between a first closed position and a second open position as the sliding closure member moves between the first and second positions. The magnetic tape cassette also has a locking means for releasably locking the sliding closure member at the first and second positions.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings.

DESCRIPTION OF THE PREFERRED EMBODIMENT

Figure 1:
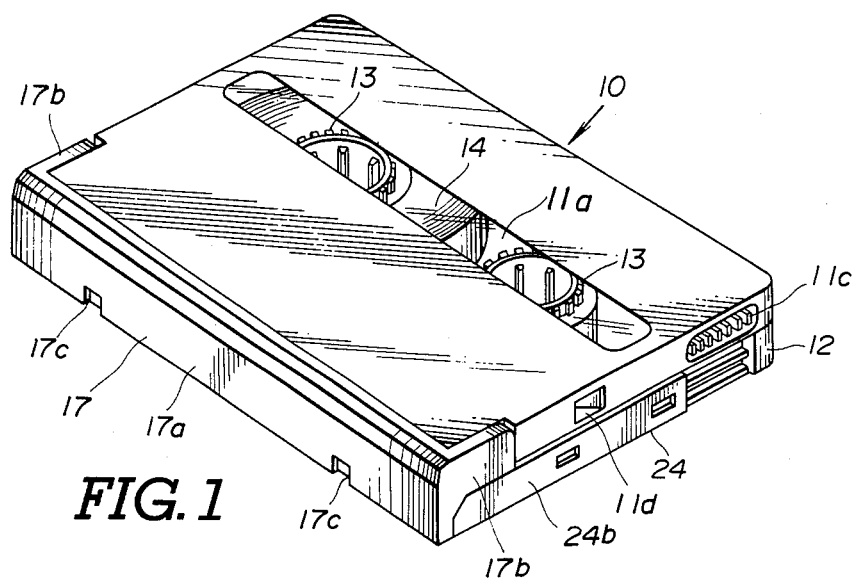
FIG. 1 is a perspective view of the preferred embodiment of a magnetic tape cassette in accordance with the present invention, in which a pivotal closure lid and a sliding closure member are in their respective closed positions.
Figure 2:
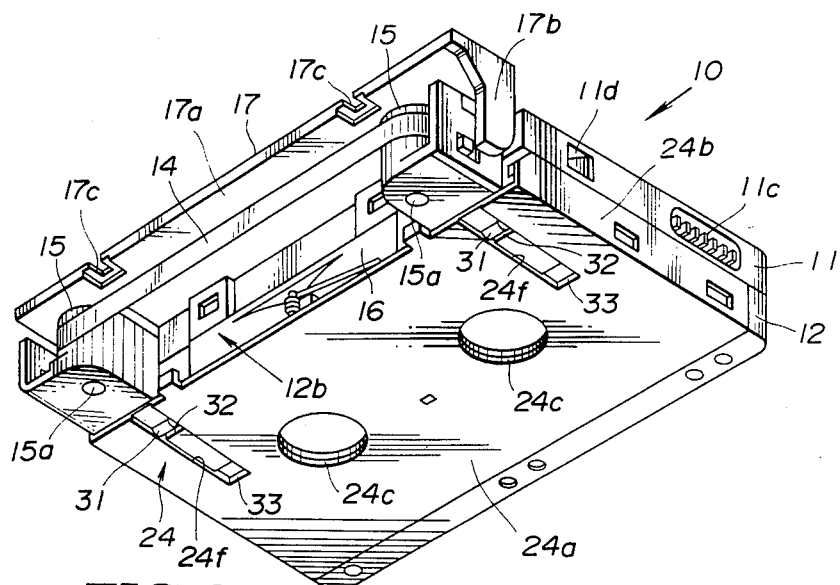
FIG. 2 is a perspective view of the magnetic tape cassette of FIG. 1, viewed from the lower side of the cassette, in which the pivotal closure lid and the sliding closure member are in their respective open positions during use of the cassette.
Figure 3:
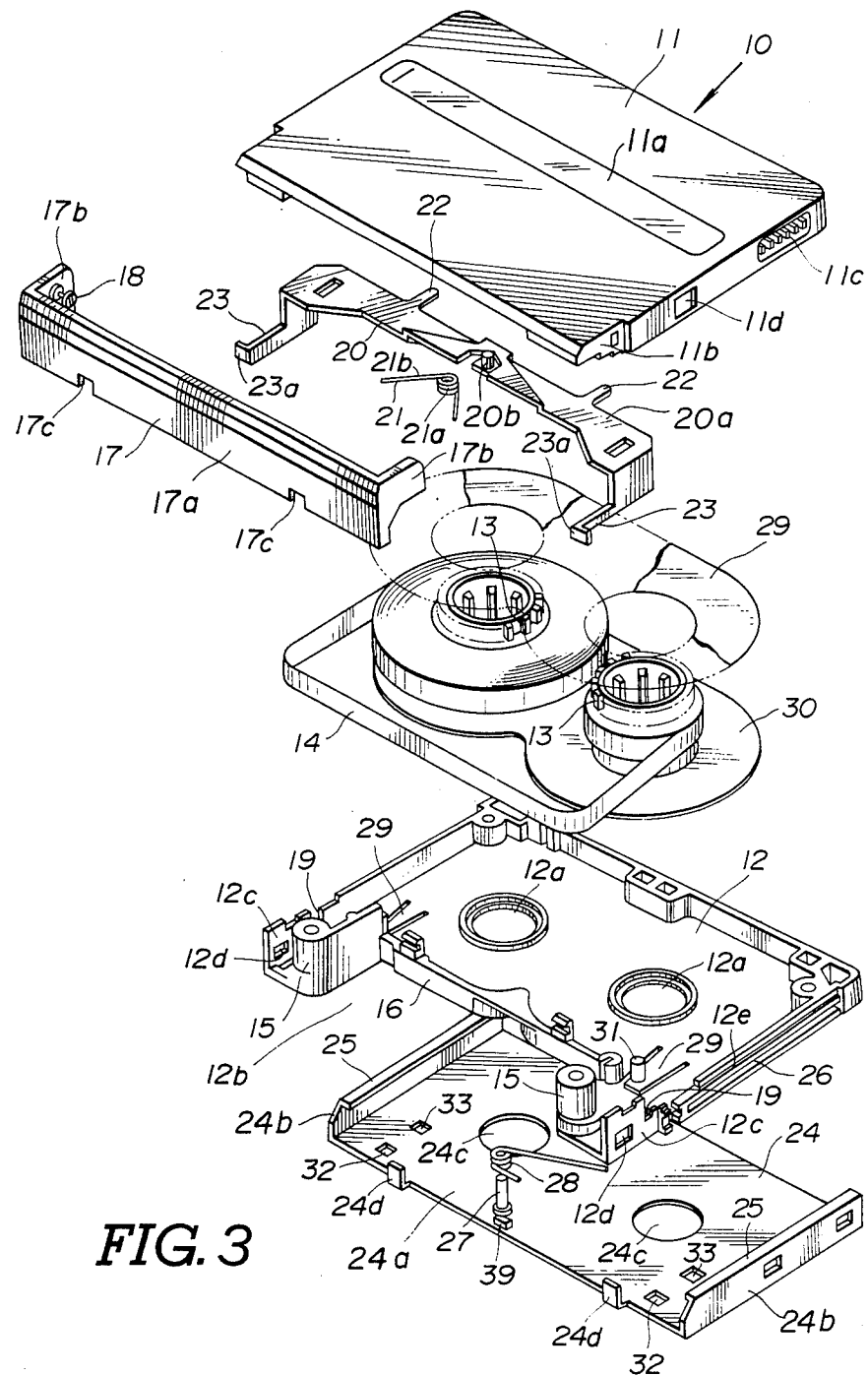
FIG. 3 is an exploded perspective view of the magnetic tape cassette of FIG. 1.

Referring now to the drawings, particularly to FIGS. 1 to 3, the preferred embodiment of a magnetic tape cassette according to the present invention generally comprises a casing 10 including an upper section 11 and a lower section 12 which are connected by threaded bolts (not shown) in a per se well-known manner to form a single unit. A transparent window plate 11a is built into the upper surface of the upper section 2. A pair of reel hubs 13 incorporated into the cassette casing 10 rotatably engage a pair of reel shaft insertion apertures 12a. The apertures 12a are formed in the lower section 12 at predetermined positions which establish a suitable spacing between the reel hubs 13. A magnetic tape 14 is wound around the reel hubs 13.

The cassette casing 10 has a front end opening through which the magnetic tape 14 is exposed to the outside. In addition, the lower section 12 of the cassette casing 10 is formed with a cut-out portion 12b at its front edge. The cut-out portion 12b adjoins the front end opening. The cut-out portion 12b of the lower section 12 extends over a predetermined width so as to expose the rear surface of the magnetic tape 14 extending thereacross. During recording or reproduction, a device constituting part of the tape loading mechanism, i.e. loading posts enter the cut-out portion 12b and draw out a section of the magnetic tape 14. Along the rear edge of the cut-out portion 12b, a vertical shield wall 16 extends upwards from the lower section 12. The shield wall 16 mates with a corresponding shield wall (not shown) extending down from the lower surface of the upper section 11. On the other hand, tape guide columns 15 are formed on both sides of the cut-out 12b. The tape guide columns 15 are generally cylindrical with rounded tape contact surfaces. The magnetic tape 14 is stretched between and around the tape guide columns 15 so as to follow a predetermined tape run or path along the front edge of the tape cassette and across the front opening over the rotary head. Positioning holes 15a are formed through the bottom of the lower section 12 directly under each tape guide column 15. The shield wall 16 and the tape guide columns 15 cooperate to define a tape path with enough clearance to accommodate a tape loading mechanism, such as the loading post of a recording and/or reproducing apparatus, e.g. PCM recorder.

A pivotal closure lid 17 is rotatably or pivotally attached at the right and left side walls of the cassette casing 10 near the front end of the tape cassette. When the pivotal closure lid 17 is pivoted away from the front surface of the tape cassette, the magnetic tape 6 is exposed through the front end opening. A sliding closure member 24 slidably engages the lower section 12 and openably covers the cut-out portion 12b.

While the tape cassette is not in use, the pivotal closure lid 17 opposes the front end opening of the cassette casing 10 to cover the latter. At the same time, the sliding closure member 24 is in its forwardly-shifted position, in which it covers the cut-out portion 12b of the lower section 12 and thus prevents the tape loading mechanism of the recording and/or reproducing apparatus from reaching into the tape cassette. The pivotal closure lid 17 can pivot away from the front surface of the magnetic tape cassette to expose the magnetic tape 14, and the sliding closure member 24 can move to the rear to expose the cut-out portion 12b so that the tape loading mechanism can reach into the cut-out portion 12b to draw some of the magnetic tape 14 out of the cassette casing 10 for loading onto a rotary drum (not shown) for recording or playback. Thereafter, when the recording or playback is over and the magnetic tape cassette is returned to the stand-by state, the pivotal closure lid 17 and the sliding closure member 24 are returned to the aforementioned closed positions. Throughout the rest of this document, the positions of the pivotal closure lid 17 and the sliding closure 24 in which they cover the front opening and the cut-out portion 12b respectively will be referred to as "stand-by position" or "closed position" and the position of the lid 17 and the closure 24 in which they expose the front opening and the cut-out portion 12b will be referred to as "operating position" or "open position".

As shown in FIGS. 1 to 3, the pivotal closure lid 17 is elongated along the major dimension of the front end opening and has arms 17b projecting from its opposite ends which pivotably attach the pivotal closure lid 17 to the front of the cassette casing 10 by means of pivot shafts 18. The pivot shafts 18 about which the pivotal closure lid 17 pivots are approximately centered on the inner surfaces of the respective arms 17b. Thus, the pivotal closure lid 17 can be pivoted to selectively cover and expose the front opening of the cassette casing 10. In order to mount the pivotal closure lid 17 pivotably, the front ends of the left and right side walls are stepped laterally inwards by the thickness of the arms 17b of the pivotal closure lid 17 to form support walls 12c. The tops of the support walls 12c are formed with indentations. When the upper section 11 and lower section 12 are assembled, matching support walls 11b in the upper section 11 abut the support walls 12c edge-to-edge. The indentations 19 then form apertures allowing pivotal mounting of the rotary shafts 19 (only one of which is visible in FIG. 3) of the closure lid 17.

The closure lid 17 also comprises a plate 17a which is elongated in the direction of the opening in the cassette casing 10 and covers the entire length of the front of the cassette casing 10. When the pivotal closure lid 17 is rotated to the closed position to cover the front of the cassette casing 10, the arms 17b lie flush with the contours of the upper section 11 as best shown in FIGS. 1 and 2 since the arms 17b are received within the step defined by the support walls 12c and 11b. The pivotal closure lid 17 is held in this position by the closure member 24 which is held in its stand-by position under the arms 17b as shown in FIG. 1.

Cut-away portions 17c are formed by cutting small grooves into the lower edge of the plate 17a toward the left and right extremes of the cut-out portion 12b of the lower section 12.

The sliding closure member 24 has a flattened U-shaped configuration and is so mounted on the lower section 12 of the cassette casing 10 that it can slide back and forth parallel to the lower surface of the lower cassette section 12. Apertures 24c respectively corresponding to the reel shaft insertion apertures 12a are formed in the sliding closure member 24 in such positions that after the sliding closure member 24 slides all the way backwards to expose the cut-out portion 12b, the apertures 24c are respectively aligned with the reel shaft insertion apertures 12a.

The sliding closure 24, as shown in FIG. 3 comprises a flat plate 24a which lies parallel to the lower surface of the lower section 12 and side plates 24b along the left and right sides of the flat plate 24a which lie parallel to the outer surfaces of the left and right side walls of the lower section 12. Flanges 25 are formed by bending the upper ends of the side plates 24b inwardly. The flanges 25 are restrained vertically but not horizontally between the side walls of the upper and lower sections 11 and 12 after the cassette casing 10 is assembled.

Contact pieces 24a extend upwards perpendicularly from the flat plate 24d at the front of the plate at positions which correspond to the cut-away portions 17c of the closure lid 17. The contact pieces 24d enable the recording and/or reproducing apparatus to slide the closure 24 to the rear in preparation for opening the cassette casing 10.

Stepped rests 12e extend along the upper edges of the left and right side walls of the lower section 12 and parallel thereto. The depth of the stepped rests 12e is not as great as the thickness of the arms 17b of the pivotal closure lid 17. Guide grooves 26 extend along each of the side wall of the lower section 12 parallel to each other and to the stepped rests 12e. Similarly to the rests 12e, the guide grooves 26 are not as deep as the arms 17b of the closure lid 17 are thick. The stepped rests 12e receive the flanges 25 of the sliding closure 24. Also, the guide groove 26 slidably receives inwardly depressed indentations 24e formed in the side plates 24b of the sliding closure 24. Sliding engagement between the rests 12e and the flange 25 and between the guide grooves 26 and the indentations 24e guides sliding movement of the sliding closure 24 with respect to the cut-out portion 12b along the side walls of the lower section.

A knurled recess 11c is formed near the rearward end of each of the right and left side walls to facilitate a secure grip when the magnetic tape cassette is held in the hand. V-shaped concave supports 11d are formed near the center of the left and right side walls. When the tape cassette is loaded in the recording and reproducing apparatus, the concave supports 11d are engaged by support studs (not shown) from both the right and the left.

As shown in FIG. 3, the reel brake member 20 comprises a slide guide plate 20a which is elongated in a direction parallel to the front opening of the casing and to the pivotal closure lid 17 and lies along the inner surface of the upper section 11. The member 20 also comprises L-shaped arms 11b, 11c which respectively extend perpendicularly downward from either end of the slide guide plate 20a and then forward. Brake pins 22 corresponding to the reel hubs 13 respectively extend rearward from the slide guide plate 20a. Brake wheels are formed on the outer peripheral portions of the reel hubs 13 opposite the brake pins 22.

A spring-engaging stud 20b is provided at the center of the slide guide plate 20a, and operating tabs 23a are formed on the extreme ends of the arms 11b and 11c respectively. The center coil 21a of a torsion spring 21 used to bias the reel brake member 20 towards its braking position is fitted onto the spring-engaging stud 20b. The free ends 21b of the spring 21 press against the rear of the shield wall of the upper section 11 so that the brake pins 22 normally engage the brake wheels of the reel hubs 13, whereby the reel hubs 13 are prevented from rotating.

In order to receive the tab 23a, rectangular apertures 12d are formed near the front, lower corners of the support walls 19.

The reel brake member 20 is so disposed within the cassette casing 10 that the ends of the tabs 23a protrude through the insertion apertures 12d of the lower section 12 outside of the support walls 12c to a predetermined extent. When the pivotal closure lid 17 is pivoted upwards, the protruding tabs 23a are engaged by the ends of the arms 17b of the closure lid 17, and the reel brake member 20 is pulled forward against the biasing force of the spring 21. The brake pins 22 are thus disengaged from the brake wheels of the reel hubs 13, allowing the reel hubs 13 to rotate. It should be noted that the closure lid 17 is driven upwards by actuating pins (not shown) of the recording/playback system when the cassette casing 10 is fully deployed in the operating position. The actuating pins provide the force needed to overcome the force of the torsion spring 21.

In order to bias the sliding closure 24 toward the forward closed position, there is provided a torsion spring 28. As shown in FIG. 3, the torsion spring 28 has a coil section 37 wound around a spring support pin 27 extending from the upper surface of the sliding closure member 24. The torsion spring 28 also has a rod-shaped extension 38a abutting against the front surface of the shield wall 16 of the lower section 12.

The torsion spring 28 also has another rod-shaped extension 38b abutting against a spring engaging block 39 fixed to the upper surface of the sliding closure member 24.

Figure 5:
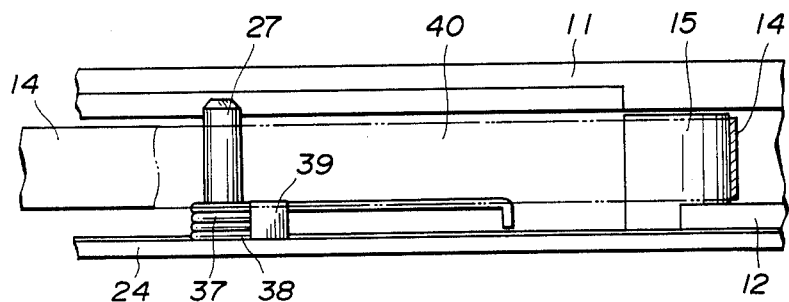
FIG. 5 is a front elevation of the biasing spring and mounting structure therefor.

As shown in FIG. 5, the height of the spring support pin 27 approximately matches that of but is slightly shorter than the overall internal height between the lower surface of the ceiling of the upper section 11 and the upper surface of the sliding closure member. The free end of the rod-shaped extension 38a is bent downwards to provide a wider contact area with the front surface of the shield wall 16.

Figure 4:
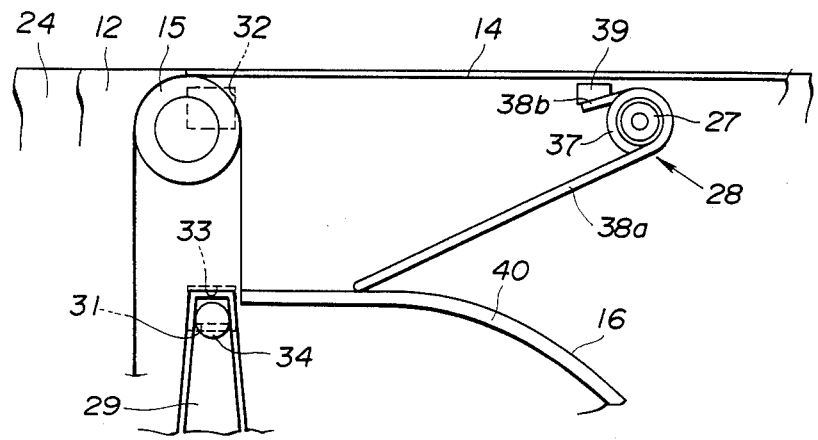
FIG. 4 is a partial plan view of the preferred embodiment of the magnetic tape cassette, showing a sliding closure member biasing spring in the closed position of the sliding closure member.
Figure 6:
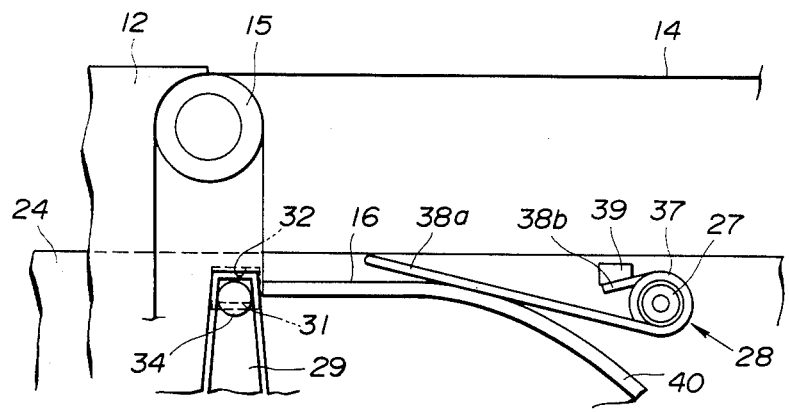
FIG. 6 is a partial plan view similar to FIG. 4, but showing the biasing spring in the open position of the sliding closure member.

The torsion spring 28 exerts its spring force in the unwinding direction of the coil section 37 and thereby biases the rod-shaped extensions 38a and 38b away from each other. In the position shown in FIG. 4, where the pivotal closure member 24 is in the forward, closed position, the spring force of the torsion spring 28 is at the level initially set when the magnetic tape cassette is assembled. On the other hand, as the sliding closure member 24 is shifted to the rearward, open position, the rod-shaped extension 38b approaches the rod-shaped extension 38a and accumulates an increasing torsional spring force. This accumulated spring force serves as a return force biasing the sliding closure member 24 toward the closed position.

Locking levers 29 with rounded locking heads 31 are integrally formed with the lower section 12. Each of the locking levers 29 is defined by an essentially U-shaped slit 29a in the lower section 12. The locking locking heads 31 are selectively engageable with pairs of openings 32 and 33 in order to lock the sliding closure member 24 in the closed or open position. The openings 32 are aligned substantially parallel to the longitudinal axis of the magnetic tape cassette as are the openings 33. Grooves 24f in the lower surface of the sliding closure member 24 cover each pair of openings 32 and 33. The peripheral edges of the openings 32 and 33 are tapered upwardly so as to facilitate unlocking of the locking head 15a when it is actuated.

The locking levers 29 also have upward extensions 34 near their free ends. The upward extension 34 is designed to engage the lower surface of the upper section after deformation of the locking lever 29 to a given extent and thereby serve as a stopper.

Actuation of the sliding closure member 24 between the closed position and the open position, and as the locking and unlocking of the sliding closure member in the closed and open positions, has been disclosed in British Patent First Publication No. 2,155,905, published on Oct. 2, 1985, and European Patent First Publication No. 01 60 822 published on Nov. 13, 1985, both assigned to the same assignee as the present invention. The discussion of the structure and actuation of the sliding closure member 24 is hereby incorporated by reference for the sake of disclosure. Also, prior descriptions of various magnetic tape cassette structures, such as is disclosed in U.S. Pat. No. 4,572,461, issued to Horikawa et al, on Feb. 25, 1986, and assigned to the same assignee as the present invention, is hereby incorporated by reference for the sake of disclosure.

As set forth above, according to the present invention, little or no space is required to accommodate the spring force biasing the sliding closure member. In addition, since the torsion spring is always hidden by the sliding closure member, the appearance of the underside of the magnetic tape cassette, especially in the sliding closure member open position, can be improved.

Figure 7:
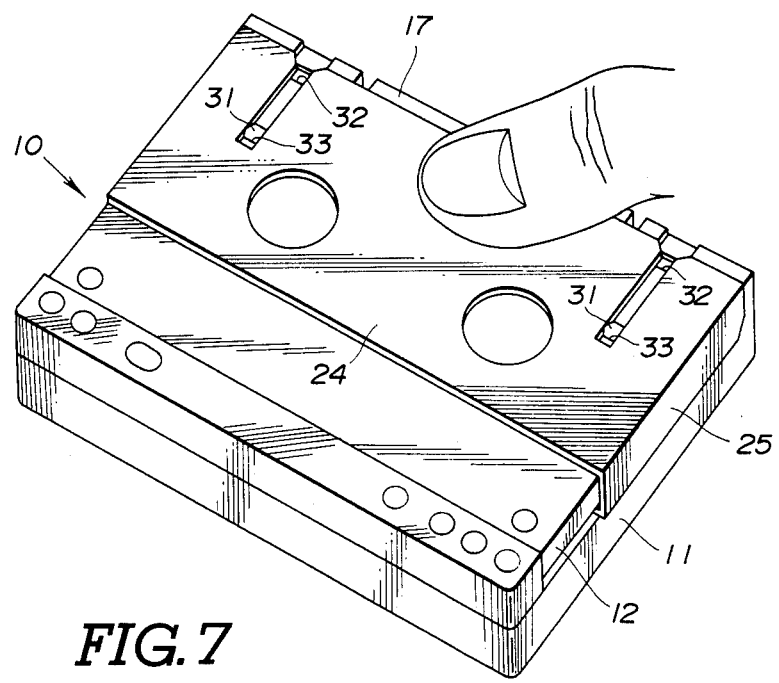
FIG. 7 is an explanatory perspective view of the preferred embodiment of the magnetic tape cassette showing how the cassette is most frequently gripped by the user.

Furthermore, the spring support pin extending from the sliding closure member serves to prevent the sliding closure member from bending even when the magnetic tape cassette is held in a manner shown in FIG. 7. When the magnetic tape cassette is gripped in the manner shown in FIG. 7, the top of the spring support pin abuts against the lower surface of the upper section 11 to prevent substantial deformation of the sliding closure member. This prevents the sliding closure member from being deformed.

Also, employing a torsion spring as the bias spring for the sliding closure member simplifies fabrication and assembly of the magnetic tape cassette. In particular, fabrication of the sliding closure member is simplified in that a sliding core which has heretofore been required to form an under-cut used to anchor one end of the coil spring is no longer unnecessary.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A magnetic tape cassette comprising:

a cassette casing housing a pair of tape reels and defining a cut-out formed at the front end of its floor and a front end opening through which a magnetic tape is exposed to the outside of said cassette casing;

a closure member slidingly attached to said cassette casing for openably closing said cut-out, said closure member being movable between a first position closing the cut-out and a second position shifted rearwardly from said first position and thereby opening said cut-out; and a torsion spring associated with said closure member for biasing the latter toward said first position, said torsion spring being secured to said closure member for movement therewith and having one end engaging the inner periphery of said cassette casing so as to accumulate spring force as said closure member shifts toward said second position.

2. A magnetic tape cassette as set forth in claim 1, wherein said cassette casing has a shield wall extending along the rear edge of said cut-out, and said one end of said torsion spring seats against the front surface of said shield wall.

3. A magnetic tape cassette as set forth in claim 2, wherein said torsion spring comprises a coil section wound around a pin extending from said closure member and bar-like section which has said one end seating against said shield wall.

4. A magnetic tape cassette as set forth in claim 3, wherein said pin is located approximately in the lateral center of the front edge of said closure member and in front of said shield wall.

5. A magnetic tape cassette as set forth in claim 4, wherein said pin has a top located immediately beneath the lower surface of the ceiling of said cassette casing so as to abut thereagainst in order to prevent significant deformation of said closure member.

6. A magnetic tape cassette as set forth in claim 5, wherein said torsion spring further comprises another bar-like section abutting a projection extending from said closure member near said pin.

7. A magnetic tape cassette as set forth in claim 6, wherein said pin and projection are so located as to be positioned in front of said shield wall when said closure member is in said second position.

8. A magnetic tape cassette comprising:

a cassette casing with a front end opening and an underside cut-out in the front edge of its floor, and a shield wall extending along the rear edge of said cut-out and defining an essentially enclosed internal space, which receives a tape reel onto which a magnetic tape is wound, and a tape run path exposed frontward and downward through said opening and cut-out;

a sliding closure member slidingly attached to the bottom of said cassette casing and movable between a first position, in which said sliding closure member closes said cut-out, and a second position, in which said sliding closure member is away from said first position to open said cut-out; and a torsion spring having a first section secured to the sliding closure member in front of said sliding wall, and a second section abutting against the front surface of said shield wall for constantly exerting a frontward biasing force on said sliding closure member.

9. A magnetic tape cassette as set forth in claim 8, wherein said first section of said torsion spring is in the form of a coil generating torsional force and wound around a pin near the front edge of said sliding closure member.

10. A magnetic tape cassette as set forth in claim 9, wherein said pin is sufficiently tall to position its top near the lower surface of the ceiling of said cassette casing so as to abut thereagainst when said sliding closure member is slightly deformed downward.

11. A magnetic tape cassette as set forth in claim 10, which further comprises a pivotal closure lid for openably closing said front end opening of said cassette casing.

12. A magnetic tape cassette as set forth in claim 11, wherein said pivotal closure lid is cooperative with said sliding closure member for movement between a first closed position and a second open position as said sliding closure member moves between said first and second positions.

13. A magnetic tape cassette as set forth in claim 10, which further comprises a locking means for releasably locking said sliding closure member at said first and second positions.

* * * * *